ABSTRACT OF THE DISCLOSURE

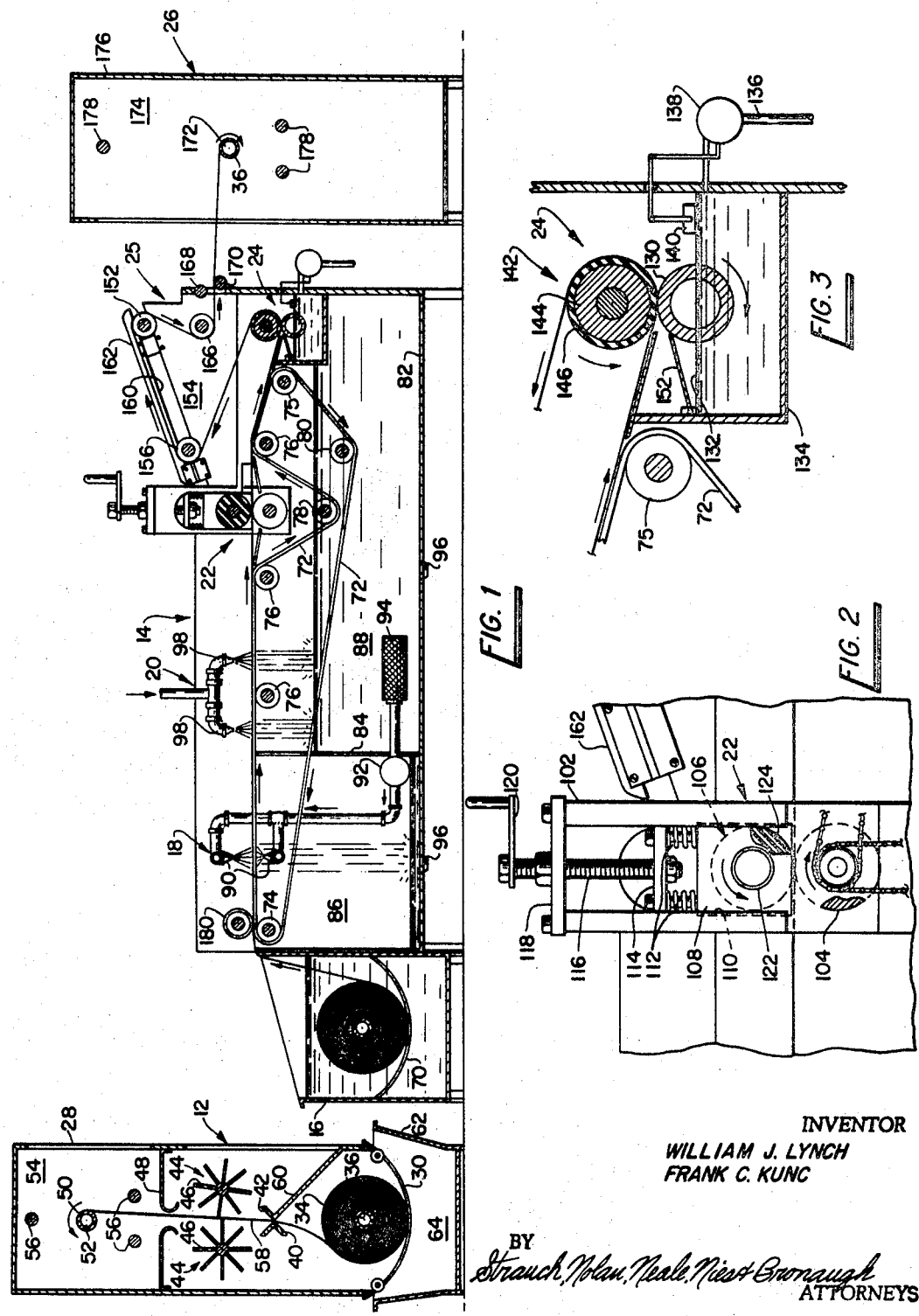
INVENTOR
WILLIAM J. LYNCH
FRANK C. KUNC 3,465,715
FILTER CLEANING AND COATING APPARATUS
William J. Lynch, Streetsboro, Ohio, and Frank C. Kunc, Springfield, Pa., assignors to North American Rockwell Corporation, a corporation of Delaware
Filed Nov. 10, 1966, Ser. No. 593,357
Int. Cl. B05c 1/12, 11/11; B08b 3/02
U.S. Cl. 118—70                                5 Claims

Apparatus for cleaning and coating a filter web including soaking, washing, rinsing, press roller extracting, and adhesive coating stations. A conveyor carries the web through the stations, but is diverted away from the press rollers which function only on the filter web. The relative position of the press rollers is adjustable to vary the pressure applied to the web. The adhesive coating is applied to the web by upper and lower rollers, the latter one being immersed in a liquid bath and having a continuous surface to apply a uniform coating, the thickness of which is controlled by an adjustable doctor blade.

---

The present invention relates to cleaning and reconditioning air filter media and more particularly to novel apparatus for cleaning dirty filter media and applying a new adhesive coating thereto to recondition the filter media for reuse.

As is well known, roll type air filters used in many industrial applications include a porous flexible web of coated filter media such as polyester urethane which is advanced at timed intervals to expose a clean section of the filter media to the airstream. Often such filters employ a replaceable filter media wound upon a roll which unwinds onto a rewind roll at the opposite end of the filter apparatus. When all of the clean filter media is unwound onto the rewind roll, a new roll of clean filter media must be installed and the rewind roll with the dirty filter media on it must be removed. Often the roll of dirty filter media is simply disposed of and a new roll is installed. Since such rolls may be up to five feet in width and up to 65 feet in length, the cost of filter replacement, particularly in installations subjected to extremely dirty conditions, is excessive.

It is accordingly a primary object of the present invention to eliminate the necessity of disposing of used filter media and to provide a cleaning and recoating method and apparatus for roll-type filter media by which a roll of dirty filter media may be effectively cleaned, recoated with an adhesive and reconditioned for continuing use at relatively low cost.

To this end the present invention provides a reconditioning system including a precleaning station to remove loose dirt from the filter media and successive washing, rinsing and wringer stations together with a recoating station and a rewinding mechanism to wind the cleaned and reconditioned filter media upon a roll for subsequent reuse in a filter installation.

Additional objects and advantages of the present invention will become apparent as the description proceeds in connection with the accompanying drawings in which:

FIGURE 1 is a schematic illustration of a complete cleaning and reconditioning system in accordance with the present invention;

FIGURE 2 is an enlarged detailed view of the wringer or nip roll arrangement which forms a portion of the apparatus FIGURE 1; and FIGURE 3 is an enlarged fragmentary vertical section illustrating details of the recoating mechanism included in the apparatus of FIGURE 1.

Referring now more particularly to the drawings, the filter media cleaning and reconditioning system of the present invention comprises a dry precleaning apparatus indicated generally at 12 and a wet washing and reconditioning apparatus indicated generally at 14, the latter apparatus comprising a soaking tank 16, a first washing station 18, a second washing station 20, a water extraction station 22, a recoating station 24 and a delivery station 25. After passage through the delivery station the cleaned and reconditioned filter media is delivered to a rewinding station 26.

The dry precleaning apparatus 12 includes an upright framework 28, the lower portion of which includes a plurality of curved supporting bars 30 which extend from the front to the rear of the apparatus and are suitably attached to the frame 28. The supporting bars 30 are adapted to support a roll of dirty filter media 34 which is normally wound on a core 36 to which the inner end of the filter material is fastened by any convenient means. The leading or free end of the filter media passes upwardly through a slot provided by oppositely positioned angle brackets 40 and 42 having their apexes pointed toward each other to provide vertical guidance and support for the filter material. From the slot the filter material passes upwardly between two oppositely positioned beater or paddle wheels 44 which have a number of radial beater elements or blades 46 which contact the filter media across its entire width. The blades 46 of the wheels are fabricated from resilient material, such as stiff rubber, and they are of such length as to slightly compress the filter material as it passes between them. The filter material extends upwardly from the beaters over a guide 48 where it is wound on a take-up spool or core 50 mounted on an arbor 52 driven by any suitable means. Conveniently, the arbor 52 and the wheels 44 are driven by a common chain or belt driven to produce low speed rotation of the arbor and high speed rotation of the wheels. To assure correct tracking and to accommodate different widths of filter media the opposite walls 54 (one shown) of the housing surrounding the arbor 52 are adjustable along guide rods 56 so that their spacing is only slightly greater than the width of the filter media being treated.

In operation, the arbor 52 is driven to cause the filter media to pass upwardly between the beaters 44 which are rotated in the direction shown so that they continuously sweep and shake the filter media and act on the filter media in a downward direction. In a typical case the filter media moves upwardly at a relatively slow speed of about 30 feet per minute while the beaters are rotated at a relatively high speed, for example up to 500 r.p.m. This effectively removes loose dirt and grit particles from the filter media.

The filter media is so arranged that its dirt side 58 is disposed toward the right as viewed in FIGURE 1. Accordingly, almost all of the loose dirt removed from the filter media will fall upon the extended skirt 60 of the guide 42 for passage onto a funnel-like guide 62 for collection in a removable dust bin 64. Preferably, a suitable stop mechanism is provided to stop the arbor 52 and the beaters 44 when the filter media has been completely unrolled from its core 36 to prevent damage to the media and the core.

After the filter media has been subjected to the action of the apparatus thus far described, the roll is taken from the arbor 52 and placed in the soaking tank 16 where it is loosely supported on a series of curved support bars 70. The soaking tank 16 is filled with water and, if desired, a surfactant cleaning agent in which the roll is completely immersed. If desired, the fluid in the tank 16 may be heated to speed the soaking action.

After a short soaking period the free end of the roll is unwound and placed on the adjacent portion of an endless belt conveyor 72 which is preferably of the chain link belt type of appropriate width to support the filter media across its entire surface. The upper reach of the conveyor 72 passes over end rolls 74 and 75 and a plurality of intermediate support rolls 76, an adjacent pair of which are positioned on opposite sides of a lower guide roll 78 under which the conveyor belt passes for a purpose to appear. The lower reach of the conveyor passes around a single guide roll 80. All or any of the guide and support rolls may be driven in a manner to move the upper reach of the conveyor from left to right as viewed in FIGURE 1.

The rolls 74, 75, 76, 78 and 80 are suitably supported in the opposite side walls of an elongated tank 82 which is divided by a vertical wall 84 into first and second washing sections 86 and 88, respectively.

Positioned above the first washing section 86 is a set of spray nozzles 90 which preferably extend across the full width of the tank and are so arranged as to direct water onto the lower as well as the upper surface of the filter media. In a typical case the nozzles 90 comprises two rows of nozzles with 18 nozzles in each row which are effective to spray water onto the filter media at the rate of 16 gallons per minute at a pressure of 90 p.s.i. Water is supplied to the nozzles 90 by a pump 92 which draws water from the second wash section 88 through a suitable filter 94, thus permitting reuse of the water collected in the second washing section. Water accumulated in the first washing section 86 is periodically withdrawn through a drain 96.

After the filter media passes through the first washing section it is delivered to the second washing or rinsing station 20 which includes two sets of top mounted nozzles 98 which, in a typical case, each comprise nine nozzles arranged across the width of the filter media. The nozzles 98 are supplied with clean city water from a conduit 100, the water being delivered under pressure of from 40–50 p.s.i.

After the filter media leaves the second washing or rinsing station 20 it passes toward the wringer station 22. At this station the conveyor belt 72 is diverted downwardly around the lower roll 78 while the filter media passes through the rolls provided at the wringer station, the construction of which is shown in greater detail in FIGURE 2 to which reference will now be made.

The wringer station comprises a framework 102 suitably secured to the upper edges of the side walls of the tank 82. The frame assembly 102 carries a lower steel roll 104 which is rotatable about a fixed axis and is driven in a clockwise direction as viewed in FIGURE 3 by any suitable means, not shown, in timed relation with the apparatus for driving the conveyor belt 72. The top roll 106 is mounted for vertical adjustment in slides 108 movable in guide ways 110 in the frame assembly 102. The slides 108 are connected by springs 112 to a cross bar 114 carried by the lower end of a threaded adjusting rod 116 which is threaded into the top plate 118 of the frame assembly 102. At its upper end, the adjusting rod 116 is provided with a handle 120 to permit vertical adjustment of the top roll 106 to thereby regulate the pressure exerted on the filter media at the wringer station. The upper roll 106 comprises a steel core 122 covered with a resilient layer 124 preferably of 60 durometer rubber. The resilient covering of the top roll as well as the spring mounting of the top roll assures complete water extraction while protecting the filter media from mechanical damage.

After the filter media leaves the wringer station 22 it is again picked up by the conveyor belt 72 for transmission to the coating apparatus 24 which is illustrated separately in FIGURE 3. As there shown the coating apparatus comprises a bottom steel roll 130, suitably mounted in the opposite side walls of the tank 82. The lower portion of the roll 130 is immersed in a commercially available adhesive oily solution 132 in a tank 134 which preferably extends the full width of the wash tank 82. Typically, the coating material is a water emulsifiable solution composed of tricresyl phosphate with gel additives. The solution in the tank 134 is continuously replenished through a supply line 136, the flow of fluid into the tank being controlled by a valve 138 operated by a float mechanism 140 which is effective to maintain a predetermined volume of coating solution in the tank 134. The upper roll 142, which is driven by means not shown in a clockwise direction in timed relation with the conveyor belt 72, comprises a steel core 144 covered by a layer 146 of resilient material such as rubber. Preferably the outer surface of the roll is provided with a series of oppositely directed helical grooves to assure a positive drive of the filter media. The amount of coating solution deposited on the filter media can be regulated by a doctor blade 150 adjustably mounted on a side wall of the tank 134.

After the filter media leaves the recoating station it passes to the delivery station 25 which comprises a dancer roll assembly including an upper roll 152 mounted for rotation about a fixed axis on a vertically projected frame assembly 154 and a lower roll 156, the axle of which is mounted for sliding movement in an inclined slot 160 in a bracket 162 forming a part of the frame 154.

After it leaves the top roll 152 the filter media passes over guide rolls 166, 168 and 170 for delivery to the rewind station 26.

The rewind station 26 includes a driven arbor 172 rotatably supported on the sidewalls 174 (one shown) of a cabinet assembly 176. The arbor 172 carries the core 36 from which the filter media was originally unwound in the precleaning station, thus, at the conclusion of the rewinding operation the cleaned and restored filter media is wound on a core suitable for installation in the filter apparatus. Preferably the sidewalls 174 of the cabinet 176 are mounted for lateral displacement along guide rods 178 so that the width of the cabinet may be adjusted to correspond to the width of the filter media to assure proper tracking.

In operation, the roll of filter media, after being subjected to the action of the dry precleaner apparatus 12 is deposited in the soak tank 16 where it is permitted to remain a relatively short time which is sufficient to assure penetration of the fluid and the cleaning agent to the core of the roll. The free end of the filter media is then deposited on the adjacent end of the chain belt conveyor 72 which is then operated manually to bring the leading end of the media opposite the wringer station 22. The feeding of the filter media is facilitated by a hold down roll 180 at the entrance end of the apparatus.

The end of the filter media is then threaded through the wringer apparatus and the entire mechanism is intermittently driven to permit threading of the media through the coating station and the delivery station. The end of the filter media is then attached to the core 36 which has been removed from the precleaner station and installed within the cabinet 176 at the rewind station. Since the filter media is usually provided with a leader section which is not used in filtering it is not necessary to operate the washing or coating apparatus during the initial threading operation.

The drive for the conveyor belt 72 together with the associated drive for the wringer station 22, the coating station 24 and rewind assembly is then started and the cleaning and reconditioning of the main body of the filter media then progresses to conclusion without attention of an operator. The speed with which the filter media travels through the washing apparatus is relatively slow, i.e., eight to ten feet per minute, to assure thorough cleaning and complete recoating of the filter media.

A large proportion of the dust, dirt and grit is removed from the filter media at the dry precleaning station. It is the function of the washing and rinsing stations 18 and 20 to remove the oily adhesive coating and, with it, the dirt adhering to this coating. Since the coating now universally used is water emulsifiable, the coating and the dirt may be readily removed by water alone although the cleaning action is facilitated by the use of a surfactant cleaning agent at least in the soaking tank. Most of the dirt is removed from the filter media at the first washing station 18 through the action of the high pressure nozzles 90. It is the function of the spray nozzles 98 at the second washing or rinsing station 20 to remove the wash water itself and thus rinse out contaminants and dirty water remnants from the preceding washing station 18.

The cleaned but water saturated filter media then passes to the wringer station 22 which is effective to remove substantially all of the water from the media. Efficient water extraction at this stage is important since the coating material subsequently applied at the coating station 24 is water emulsifiable which can be applied effectively only to a filter media which is essentially completely dry.

The filter media is then again picked up by the conveyor belt 72 for passage through the coating station where the oily adhesive coating is uniformly applied as described above. The media then passes through the dancer roll assembly of the delivery station 25 for rewinding on the core 36. The dancer roll assembly compensates for variations in the surface speed on the traveling media as it unwinds from the soak tank and is rewound on the core 36 due to the changing diameters of the rolls at both ends of the apparatus. It also permits rapid stop and start of the apparatus without danger of breaking the filter media. When the filter media has been completely rewound on the core 36 at the rewind station 26 it is ready for immediate reuse in a filter installation.

Thus the present invention provides a convenient, efficient and rapid system for cleaning and restoring used filter media. The precleaning of a 65-foot roll in the dry precleaner apparatus 12 can be performed in about two minutes. The soaking time for a filter media of this size will be about five minutes and the passage through the remainder of the apparatus from the soaking tank to the rewind mechanism is usually accomplished in about eight minutes.

What is claimed and desired to be secured by Letters Patent is:

1. Apparatus for cleaning and reconditioning a long web of used porous filter media comprising:
   a tank for holding a volume of liquid within which the long web of filter media is immersed for initial soaking,
   a washing section including washing nozzles for spraying high pressure cleaning fluid on said web,
   a rinsing section including rinsing nozzles for spraying low pressure rinsing fluid on said web,
   wringer means including upper and lower rolls for substantially drying said web,
   coating apparatus for coating at least one side of said web with an oily adhesive solution,
   and conveying means for delivering said web from said soaking tank successively to said washing section in proximity to said high pressure nozzles, said rinsing section in proximity to said low pressure nozzles, said wringer rolls, and said coating apparatus,
   said conveying means being arranged such that said web passes between the upper and lower rolls of said wringer means out of contact with said conveying means.

2. The apparatus according to claim 1 wherein the fluid delivered by said rinsing nozzles is collected in said rinsing section, together with means for delivering said fluid in said rinsing section to said washing nozzles.

3. The apparatus according to claim 2 wherein said coating apparatus comprises a pair of upper and lower rollers between which said web passes, said lower roller being partially immersed in said adhesive solution and having a continuous surface effective to deposit a uniform coating of said solution across said web, and means for controlling the amount of solution deposited on said web.

4. The apparatus of claim 1 wherein said wringer means includes a frame, and adjustable means mounting one of said rollers for vertical movement on said frame and urging said one roller into engagement with said web and other roller, whereby the pressure applied to said web may be varied.

5. The apparatus of claim 1 wherein said conveyor means includes a continuous belt and means for diverting said belt away from said rollers, whereby only said web passes between said rollers.

References Cited

UNITED STATES PATENTS

| | | | |
|---|---|---|---|
| 670,098 | 3/1901 | Brassard | 68—45 |
| 2,633,431 | 3/1953 | De Sylva. | |
| 1,719,410 | 7/1929 | Webb | 134—60 |
| 1,723,514 | 8/1929 | Klein | 15—40 X |
| 2,249,521 | 7/1941 | Graham et al. | 15—302 X |
| 2,282,628 | 5/1942 | Whann et al. | 118—73 X |
| 2,541,901 | 2/1951 | Zademach et al. | |
| 2,580,406 | 1/1952 | Calton | 118—73 X |
| 2,736,632 | 2/1956 | Blau | 68—44 X |
| 2,787,153 | 4/1957 | Ketchum et al. | 15—40 X |
| 3,073,716 | 1/1963 | Gilchrist | 118—249 |
| 3,083,126 | 3/1963 | Griffiths | 134—60 X |

WALTER A. SCHEEL, Primary Examiner

ROBERT I. SMITH, Assistant Examiner

U.S. Cl. X.R.

118—249; 134—64